(12) United States Patent
Stallings

(10) Patent No.: US 12,460,896 B2
(45) Date of Patent: Nov. 4, 2025

(54) APPARATUS AND SYSTEM FOR CARRYING OUTDOOR EQUIPMENT

(71) Applicant: Tyler Stallings, Midland, TX (US)

(72) Inventor: Tyler Stallings, Midland, TX (US)

(*) Notice: Subject to any disclaimer, the term of this patent is extended or adjusted under 35 U.S.C. 154(b) by 312 days.

(21) Appl. No.: 18/122,173

(22) Filed: Mar. 16, 2023

(65) Prior Publication Data

US 2023/0296346 A1    Sep. 21, 2023

Related U.S. Application Data

(60) Provisional application No. 63/322,060, filed on Mar. 21, 2022.

(51) Int. Cl.
| | |
|---|---|
| *A45F 3/14* | (2006.01) |
| *F16M 13/04* | (2006.01) |
| *F41B 5/14* | (2006.01) |
| *A45F 3/00* | (2006.01) |

(52) U.S. Cl.
CPC .............. *F41B 5/1461* (2013.01); *A45F 3/14* (2013.01); *F16M 13/04* (2013.01); *A45F 2003/003* (2013.01); *A45F 2003/146* (2013.01)

(58) Field of Classification Search
CPC .......... A45F 2003/003; A45F 2003/142; A45F 2003/146; A45F 3/14; F16M 11/041; F16M 13/04; F41B 5/066; F41B 5/14; F41B 5/1461; Y10T 403/595; Y10T 403/7007; F41C 33/006

USPC ......................................................... 224/183
See application file for complete search history.

(56) References Cited

U.S. PATENT DOCUMENTS

| | | | | |
|---|---|---|---|---|
| 7,210,605 | B2* | 5/2007 | Willows ................. | G08B 5/004 |
| | | | | 224/637 |
| 7,314,331 | B1* | 1/2008 | Koros ..................... | A61B 90/50 |
| | | | | 403/DIG. 4 |
| 2009/0090340 | A1* | 4/2009 | Ewing ................... | F41B 5/1461 |
| | | | | 224/257 |
| 2020/0188764 | A1* | 6/2020 | Rocha ....................... | A45F 5/02 |

* cited by examiner

*Primary Examiner* — Nathan J Newhouse
*Assistant Examiner* — Matthew T Theis
(74) *Attorney, Agent, or Firm* — J. Andrew Reed; Think Differenth Legal, PLLC

(57) ABSTRACT

An apparatus for carrying a bow. The apparatus includes a magnet. The adapter further comprises a housing having a latch, a first screw, and a receiver. The first screw is inserted through the opening of the latch. The adapter further comprises a rod having a second screw, a first member, and a second member. The first member and second member inserted into the magnet. The second screw is inserted through the first member and into the second member, thereby coupling the magnet with the rod. A lever is movably coupled to the housing. A third screw connects the housing to the bow. The coupled magnet and rod are inserted into the proximal end of the housing. The lever is rotated to connect the magnet to the bow.

14 Claims, 10 Drawing Sheets

APPARATUS AND SYSTEM FOR CARRYING OUTDOOR EQUIPMENT

CROSS-REFERENCE TO RELATED APPLICATIONS

This application is a non-provisional application of, and claims the benefit of, U.S. Provisional Application No. 63/322,060, filed on Mar. 21, 2022, the disclosure of which is incorporated by reference in its entirety.

BACKGROUND

Technical Field

The present disclosure relates to the field of outdoor equipment. More particularly, and not by way of limitation, the present disclosure is directed to a system method, and/or apparatus for carrying a bow.

Background

Outdoor equipment has often been transported by users via shoulder straps. For example, hunting rifles are generally carried by users with a shoulder strap. Shoulder straps provide an alternative to carrying the equipment by hand. However, the use of a shoulder strap can restrict the movement of the user. For example, a bow secured to a user via a shoulder strap periodically necessitates the user to use a hand to maintain the security with the bow and thus decreases the user's mobility. Additionally, a bow secured via a shoulder strap contacts the user's legs and inhibits the user's movement. The same issues exist with other equipment such as rifles and fishing equipment but has often been overcome with equipment specific positioning via a strap system. Accordingly, a need exists for an improved system and/or apparatus for carrying a bow without inhibiting the movement of a user's extremities.

SUMMARY

Aspects of the present disclosure are directed to an apparatus for securing a bow to a user. In one example, the apparatus may comprise a magnet having a first surface and a second surface. A passageway extends through the magnet from the first surface to the second surface. The apparatus may further include a housing defining a path, where the housing comprises a latch, a first screw, and a receiver. The latch, having an opening, extends from the housing. The first screw is inserted through the opening of the latch. The receiver is formed through the housing. The apparatus further includes a rod having a second screw, a first member, and a second member. The second member defines a threaded path. The first member is inserted into an opening in the first surface of the magnet. The second member is inserted into an opening in the second surface of the magnet. The second screw is inserted through the first member and threaded with the second member, thereby coupling the magnet with the rod.

The apparatus may further comprise a lever movably coupled to the housing. The lever includes an arm, a base, and a cylinder. The arm has a top surface and a bottom surface. The arm includes a tooth protruding from the bottom surface. The tooth is configured to releasably couple to the receiver formed through the housing. The base of the lever has a channel with a threaded portion. The first screw is threaded through a portion of the channel and into the cylinder, thereby coupling the lever and the housing. The apparatus can further comprise a third screw threaded through the bow and into the distal end of the housing, thereby connecting the housing to the bow. The coupled magnet and rod are inserted into the proximal end of the housing. The lever is rotated to couple the tooth with the receiver, thereby tightening the housing around the rod and connecting the magnet to the bow.

Thus, in one aspect, the present disclosure is directed to a system for carrying a bow. The system includes a harness having a first magnet and one or more straps. The one or more straps configured to secure the magnet on a user. The system further comprises an adapter having a second magnet. The second magnet includes a first surface, a second surface, and a passageway extending through the magnet from the first surface to the second surface. The adapter may further comprise a housing defining a path, where the housing comprises a latch, a first screw, and a receiver. The latch, having an opening, extends from the housing. The first screw is inserted through the opening of the latch. The receiver is formed through the housing. The adapter can further comprise a rod having a second screw, a first member, and a second member. The second member defines a threaded path. The first member is inserted into an opening in the first surface of the magnet. The second member is inserted into an opening in the second surface of the magnet. The second screw is inserted through the first member and threaded with the second member, thereby coupling the magnet with the rod.

The system may further comprise a lever movably coupled to the housing. The lever includes an arm, a base, and a cylinder. The arm has a top surface and a bottom surface. The arm includes a tooth protruding from the bottom surface. The tooth is configured to releasably couple to the receiver formed through the housing. The base of the lever has a channel with a threaded portion. The first screw is threaded through a portion of the channel and into the cylinder, thereby coupling the lever and the housing. The system can further comprise a third screw threaded through the bow and into the distal end of the housing, thereby connecting the housing to the bow. The coupled magnet and rod are inserted into the proximal end of the housing. The lever is rotated to couple the tooth with the receiver, thereby tightening the housing around the rod and connecting the magnet to the bow. The system further comprises a third screw threaded through the bow and into the distal end of the housing, thereby connecting the housing to the bow. The coupled magnet and rod are inserted into the proximal end of the housing. The lever is rotated to couple the tooth with the receiver, thereby tightening the housing around the rod and connecting the magnet to the bow. The adapter attaches to the harness via the first magnet and the second magnet, thereby securing the bow onto the user.

Other aspects, embodiments and features of the present disclosure will become apparent from the following detailed description when considered in conjunction with the accompanying figures. In the figures, each identical, or substantially similar component that is illustrated in various figures is represented by a single numeral or notation. For purposes of clarity, not every component is labeled in every figure. Nor is every component of the disclosure shown where illustration is not necessary to allow those of ordinary skill in the art to understand the disclosure.

BRIEF DESCRIPTION OF THE FIGURES

The novel features believed characteristic of the present disclosure are set forth in the appended claims. The disclosure itself, however, as well as a preferred mode of use, further objectives and advantages thereof, will be best understood by reference to the following detailed description of illustrative embodiments when read in conjunction with the accompanying figures.

DETAILED DESCRIPTION

Embodiments of the disclosure will now be described.

Figure 1:
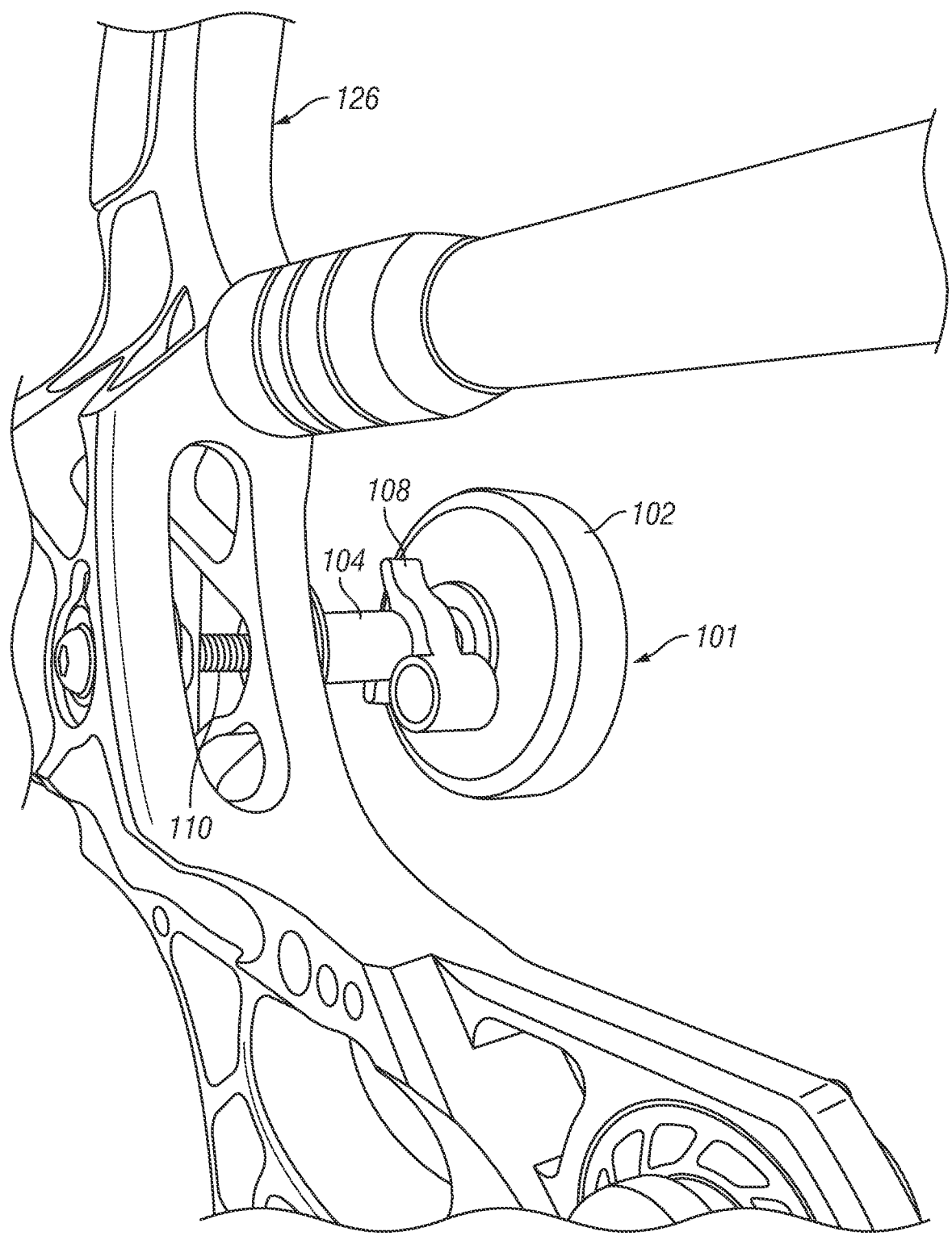
FIG. 1 is a view of a bow having an apparatus to secure the bow to a user.

FIG. 1 is a view of a bow 126 having an apparatus 101 (may also be referred to as a securing or coupling apparatus) to secure the bow 126 to a user. The bow 126 as illustrated is a compound bow; however the bow 126 may include a long bow, a recurve bow, crossbow, and/or compound bow. A compound bow may have cams, limbs, riser(s), mount(s) for rests and sights, cable(s), guard(s), nock(s), grip(s), and/or other components. The apparatus 101 includes a magnet 102, a rod (not illustrated), a housing 104, a lever 108, and a screw 110. The magnet 102 can couple with a second magnet (not illustrated) that allows for engagement with a strap system (not illustrated) for carrying. In at least one example, the magnet 102 is coupled to a sight mount or a rest mount location on a bow 126. It would be understood that other locations may be utilized based on the type of bow 126, design and/or placement of mounting locations. The rod is inserted through the magnet 102 and releasably coupled to the housing 104. In at least one example, the rod may be threaded to allow for engagement with an engagement surface (not illustrated) of the magnet 102. A threaded rod can be a helical thread similar to that of a bolt or screw that allows for engagement with another object and/or for linear position change based on the rotation of said another object or the threaded rod.

With continued reference to FIG. 1, the lever 108 is rotatably coupled to the housing 104 and is configured to engage the rod, thereby coupling the rod to the housing 104. In some examples, the housing 104 may comprise a tubular shape. As described in further detail herein, the housing 104 may define a path having a cross-sectional area to engage with the rod. The housing 104 is designed for quick engagement and disengagement with the coupled rod and magnet. The screw 110 is inserted through an opening in the bow 126 and inserted into the housing 104, thereby coupling the housing to the bow 126. A screw can be a helical thread similar to that of a bolt that allows for engagement with another object and/or for linear position change based on the rotation of said another object or the screw.

Referring to FIGS. 2A, 2B, 2C, 2D, and 2E, illustrations of an exemplary apparatus are shown. The magnet 202 has a first surface and a second surface. The magnet 202 may comprise any magnetic material known in the art. In a non-limiting example, the magnet 202 may comprise a neodymium alloy and/or a samarium alloy. While generally circular in shape and cylindrical in volume, it would be understood, that the magnet could take on any shape or volume. In at least one example, a passageway extends through the magnet 202 from the first surface 202A to the second surface 202B. In one example, the first surface 202A is distal to the bow and housing 204, and the second surface 202B is proximal to the bow and housing 204. In at least one embodiment, the first surface 202A engages with a strap system (not illustrated) while the second surface 202B engages with the housing and/or rod. The rod 206, inserted through the magnet 202, couples to the housing 204.

The housing 204 defines a path 205, with a proximal end 204A and a distal end 204B. The rod 206 is inserted into the proximal end of the path 205 of the housing 204. Screw 210 is inserted into a distal end of the path 205 of the housing 204. The path 205 of the housing may comprise a threaded portion. The threaded portion may extend the entirety of the path or any distance from the distal end of the path 205. In some examples, the path 205 comprises a circular cross-sectional shape or any other cross-sectional shape known in the art. The screw 210 may be threaded and configured to engage with the threaded portion of the path. Referring to FIGS. 2A, 2B, 2C, 2D, and 2I, the housing 204 may comprise a latch 218, a screw 224, and a receiver 216. The latch 218 extends radially from the housing 204 and comprises an opening 220. The screw 224 is inserted through the opening 220 of the latch 218. The receiver 216 is formed through the housing 204. The screw 224 is configured to secure the housing, via the latch 218, to a lever 208. The receiver 216 is configured to receive a tooth (not illustrated) for securing the rod 206 to the housing 204.

Figure 2A:
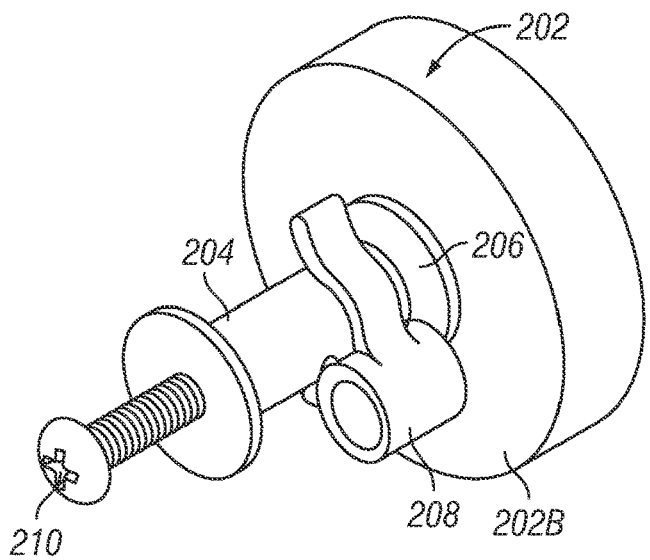
FIGS. 2A-2E are various views of the apparatus in FIG. 1.
Figure 2B:
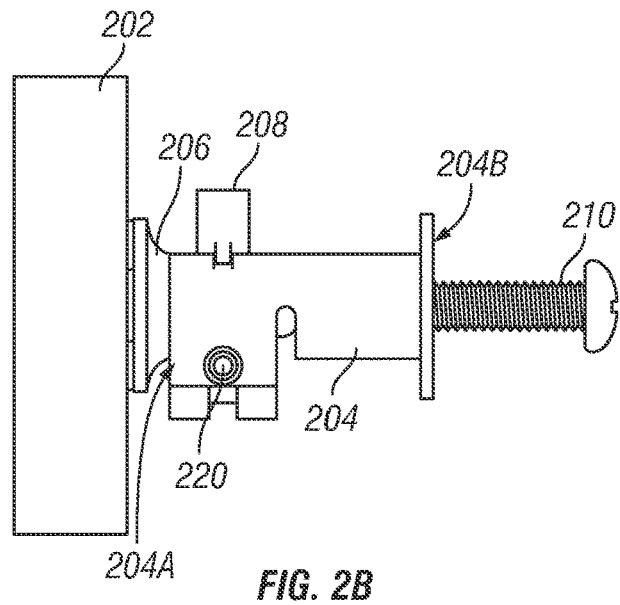
Figure 2C:
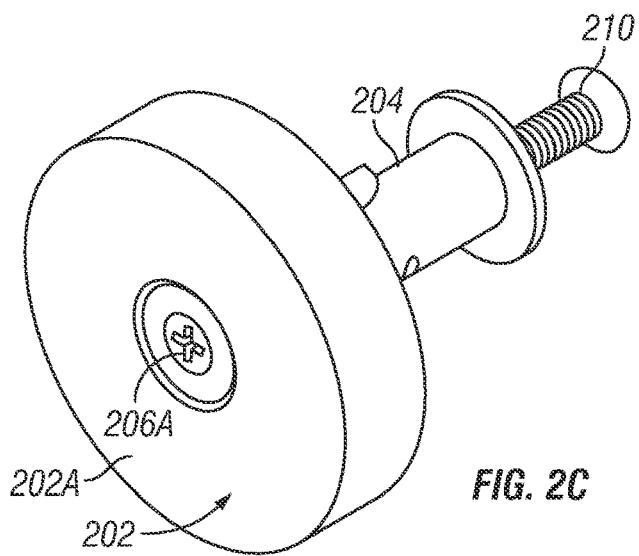
Figure 2D:
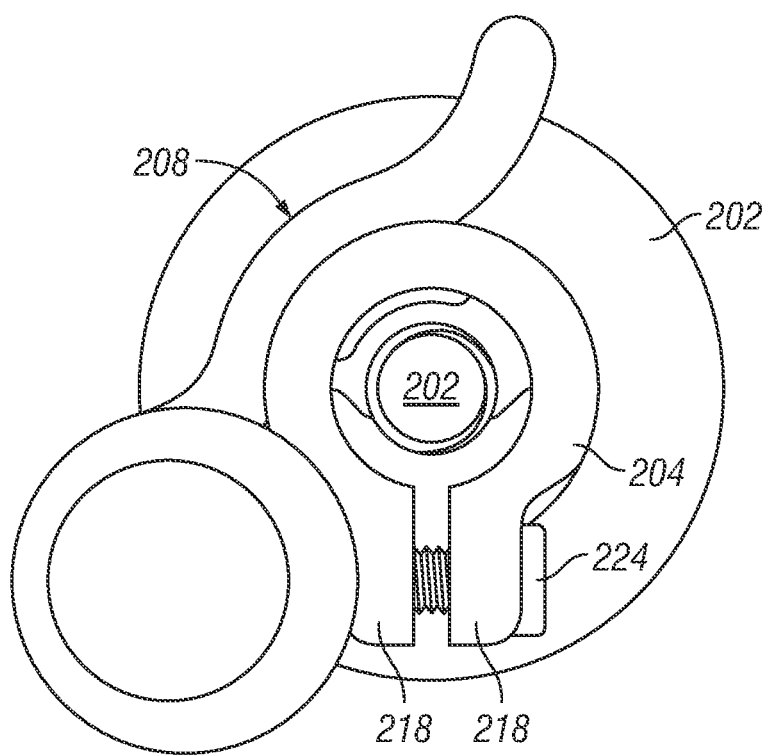
Figure 2E:
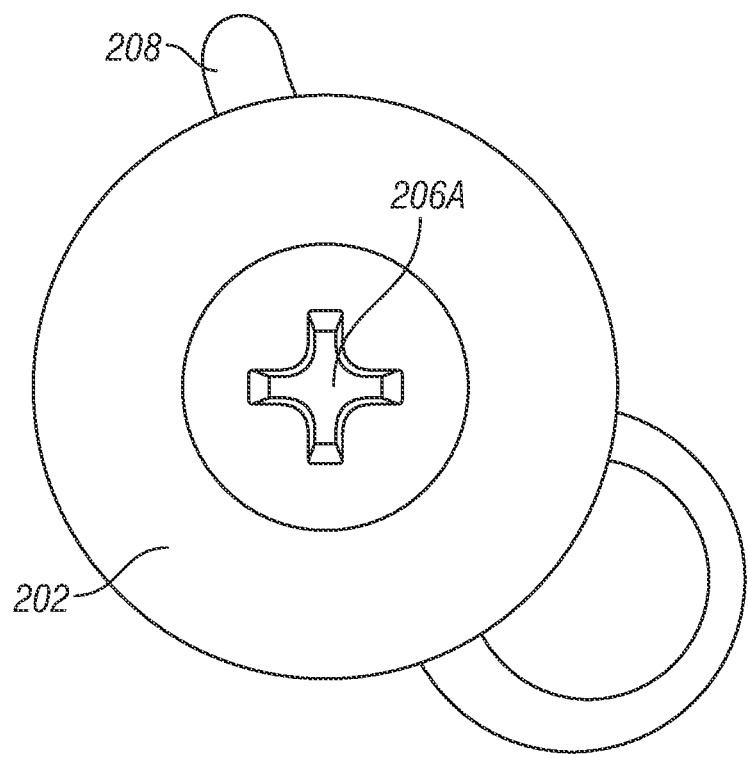
Figure 2F:
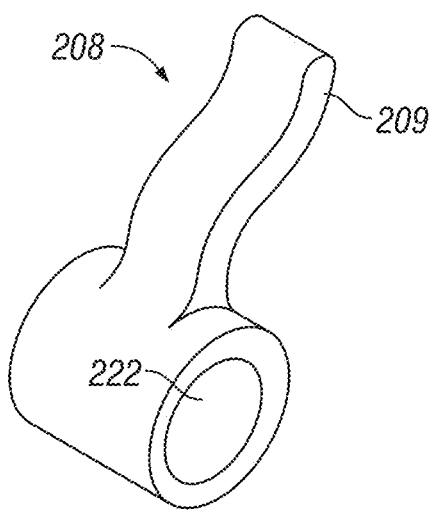
FIGS. 2F-2G are various views of a latch of the apparatus in FIG. 1.
Figure 2G:
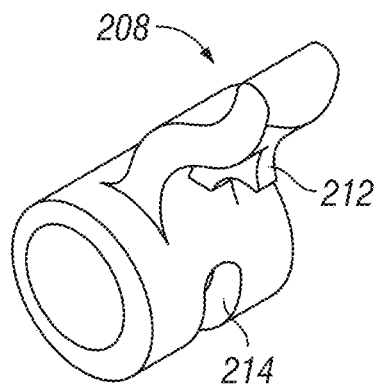
Figure 2H:
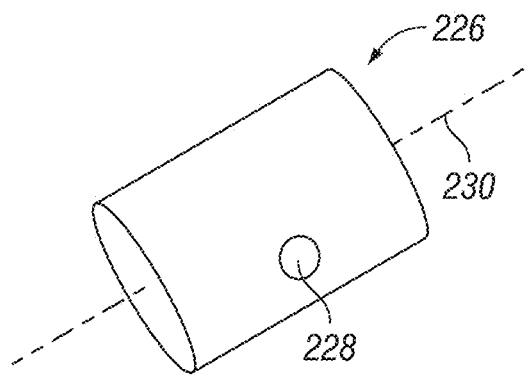
FIG. 2H is a view of a cylinder for use with a latch.

Referring to FIGS. 2A, 2D, 2F, and 2G, various views of a lever 208 are illustrated. The lever 208 is movably coupled to the housing 204. The lever 208 includes an arm 209 and a base 222. The arm 209 has a top surface and a bottom surface. The arm 209 includes a tooth 212 protruding from the bottom surface. The tooth 212 is configured to releasably couple to the receiver 216 formed through the housing 204. The base 222 of the lever 208 has a channel 214 for engagement with the screw 224. Referring to FIG. 2H, the lever may further include a cylinder 226 having a threaded channel 228 extending radially from the outer curved surface of the cylinder 226 towards the axis 230 of the cylinder 226. The cylinder 226 is configured to insert into the base 222 of the lever 208 for engagement with the housing. The length of the threaded channel 228 may extend the diameter of the cylinder 226 or any length between. Upon insertion, the threaded channel 228 is aligned with the channel 214 of the base 222. The lever 208 may engage with the housing 204 by threading the screw 224 through the latch 220 and into the threaded channel 226 of the base 222 of the lever 208. In another configuration, the channel 214 is also threaded and the screw 224 is threaded into both the channel 214 and the threaded channel 226. In yet another configuration, the channel 214 of the lever 208 is threaded, but the lever 208 does not have a cylinder. In such a configuration, the lever 208 is engaged with the housing 204 by threading the screw 224 into the channel 214.

Figure 2I:
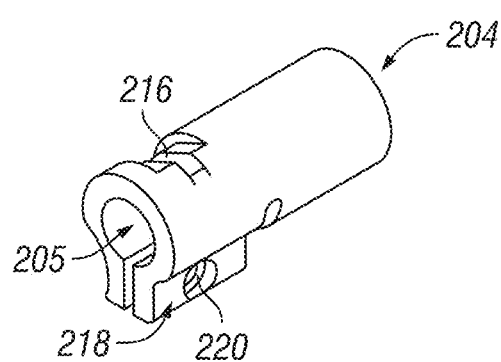
FIG. 2I is a view of a housing of the apparatus in FIG. 1.
Figure 2J:
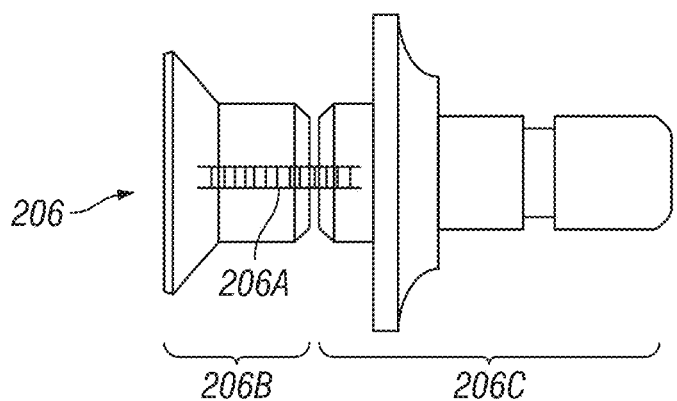
FIG. 2J is a view of a rod of the apparatus in FIG. 1.

Referring to FIG. 2I, a view of a rod 206 is shown. The rod 206 may comprise a screw 206A, a first member 206B, and a second member 206C. The first member 206B and the second member 206C may each define a path. In at least one example, the path of the second member 206C contains a threaded portion. In another example, the paths of the first member 206B and the second member 206C contain threaded portions. Referring to FIGS. 2A, 2B, 2C, and 2D, the first member 206B is inserted into an opening in the first surface of the magnet 202. The second member 206C is inserted into an opening in the second surface of the magnet 202. The screw 206A is inserted through the first member and threaded with the second member, thereby coupling the magnet 202 with the rod 206. The coupled magnet 202 and rod 206 are inserted into the proximal end of the housing 204. The lever 208 is rotated to couple the tooth 212 with the receiver 216, thereby tightening the housing 204 around the rod 206 and connecting the magnet 202 to the bow. As the lever 208 is rotated to couple the tooth 212 with the receiver 216, the screw 224 is pulled by the cylinder 226 and/or channel 214 through the opening 220, thereby closing the distance between the latch 218. When the distance between the latch 218 decreases, the area of the path 205 decreases and causes the tightening (or increased tension) around the rod 206. The coupled magnet 202 and rod 206 may be quickly disengaged from the housing 204 by releasing the tooth 212 from the receiver 216. In one example, the tooth 212 may be released from the receiver 216 by pushing on the bottom surface of the arm 209.

Figure 3:
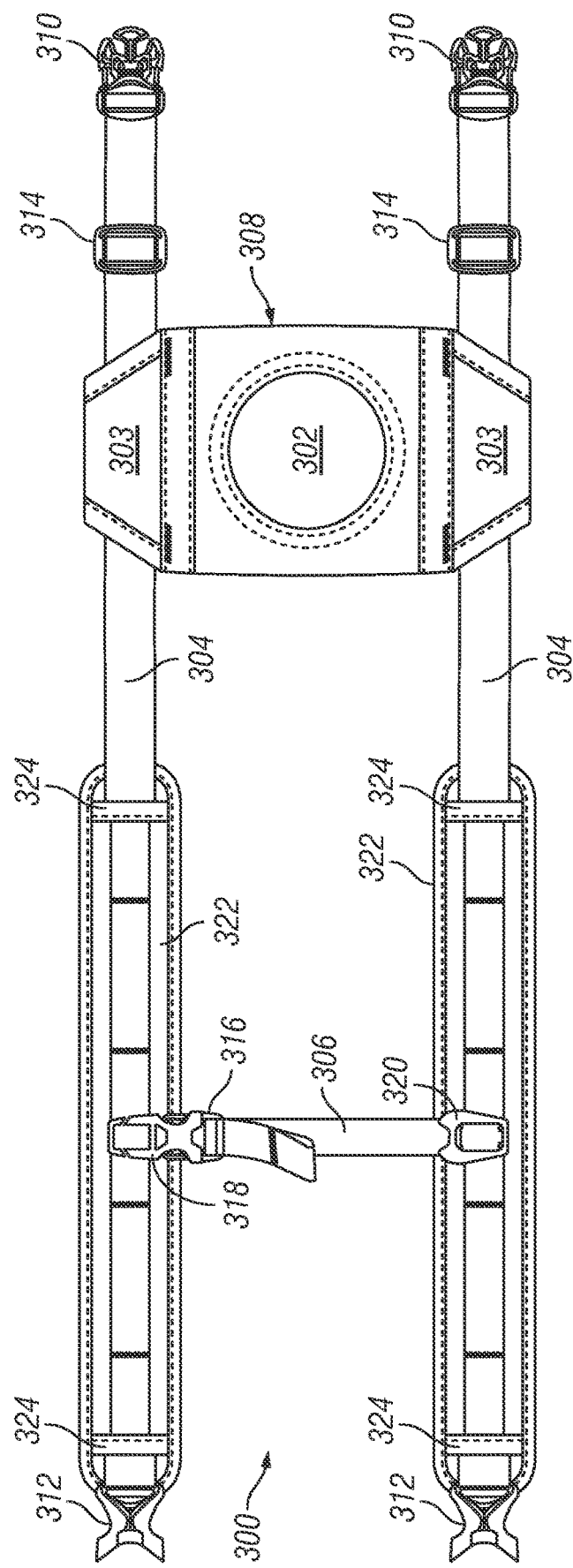
FIG. 3 is a view of a harness for securing the bow to the user.

Referring to FIG. 3, a view of a harness 300 is shown. The harness may comprise an encasement 308, a magnet 302, and one or more straps 304. The magnet 302 may be coupled to a surface of the encasement 308 or formed into the interior of the encasement 308. The magnet 302 may comprise any magnetic material known in the art. In a non-limiting example, the magnet 302 may comprise a neodymium alloy and/or a samarium alloy. The encasement 308 may comprise a synthetic material. In some examples, the synthetic material may be a nylon fabric such as corduroy fabric and the like. In examples where the magnet 302 is formed into the interior of the encasement 308, the magnet 302 is wrapped in the synthetic material.

The encasement may comprise one or more looped panels 303. The looped panels may extend from the sides of the encasement 308. The straps 304 may be inserted through the one or more looped panels 303 extending from encasement 308. The straps 304 have a first end and a second end. A male-end clip 310 may be coupled to the first end. A female-end clip 312 may be coupled to the second end. The male-end clip 310 may be releasably coupled to the female-end clip 312. In some examples, the male-end clip 310 and the female-end clip 312 may be a squeeze buckle.

The straps 304 may include a sheath 322 on the second end 304. The sheath 322 may comprise one or more loops 324 attached to the surface. The straps 304 are inserted through the loops 324, thereby securing the sheath 322 to the straps. The sheath 322 may comprise a soft material. In a non-limiting example, the sheath 322 may be a padded material such as a foam, which may provide added comfort to the user by absorbing the added weight from the bow. The straps 304 may comprise an adjustable slider buckle 314 positioned between the male-end clip 310 and the encasement 308. The adjustable slider buckle 314 may be used to adjust the positioning of the encasement 308 when the harness 300 is secured to the user.

The straps 304 may further include a cross strap 306 that is connected to each strap 304. The cross strap 306 includes a first end and a second end. The first end of the cross strap 306 may be secured to a strap 304 via a buckle 320. A male-end clip 316 may be coupled to the end of the second end of the cross strap 306. The male-end clip 316 may be releasably coupled to a female-end clip 318 that is secured to the opposing strap 304. In some examples, the male-end clip 316 and the female-end clip 318 may be a squeeze buckle. The cross strap 306 may comprise a material that has a high degree of elasticity. For example, the cross strap 306 may comprise a polymer such as a cotton webbing, nylon webbing, polyester webbing, polypro webbing, latex webbing, and the like. The male-end clip 316 and the female-end clip 318 may be secured to the straps 304 via an adjustable slider buckle, which may be used to adjust the positioning of the cross strap 306 when the harness 300 is secured to the user.

Figure 4A:
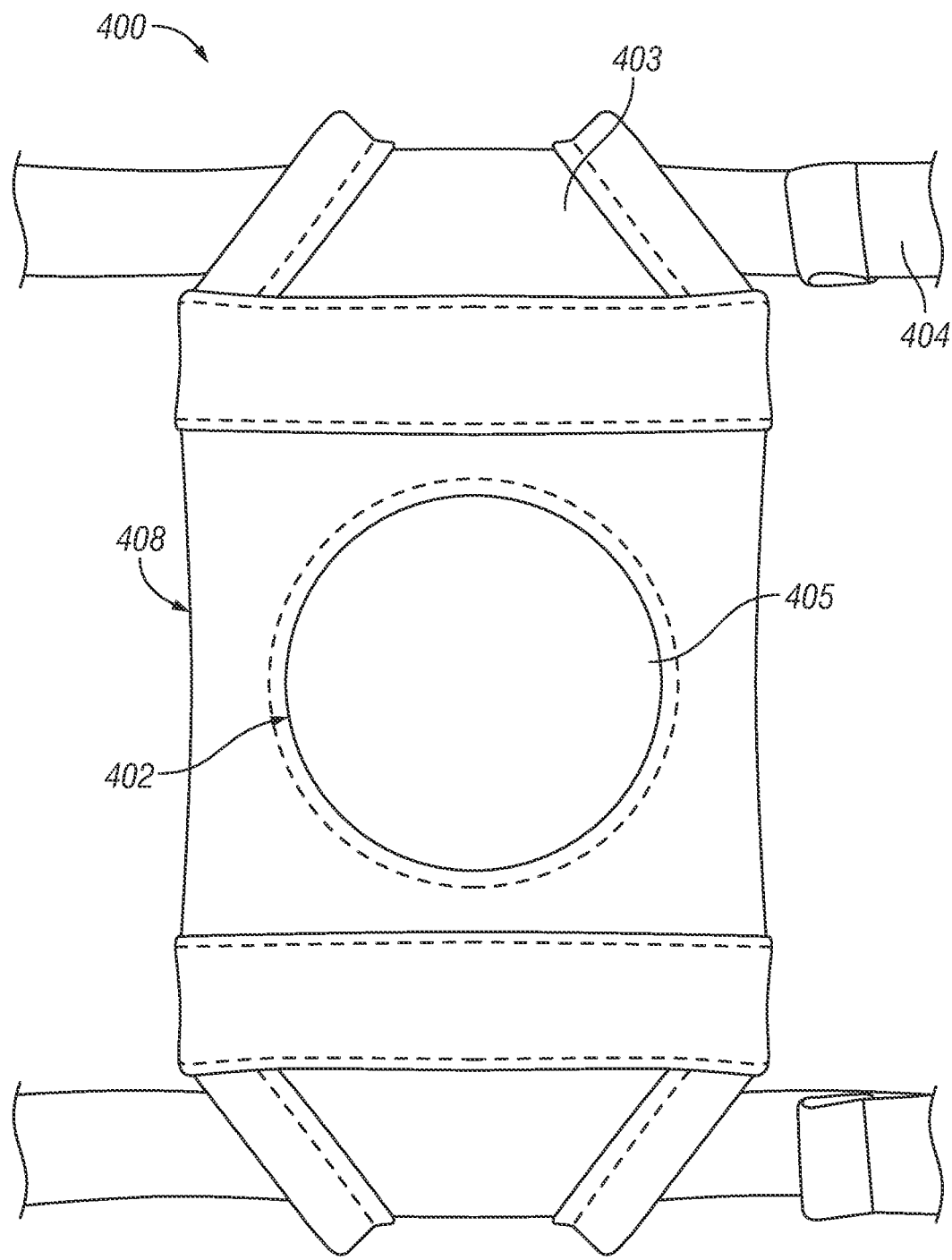
FIG. 4A is a top view of a harness.
Figure 4B:
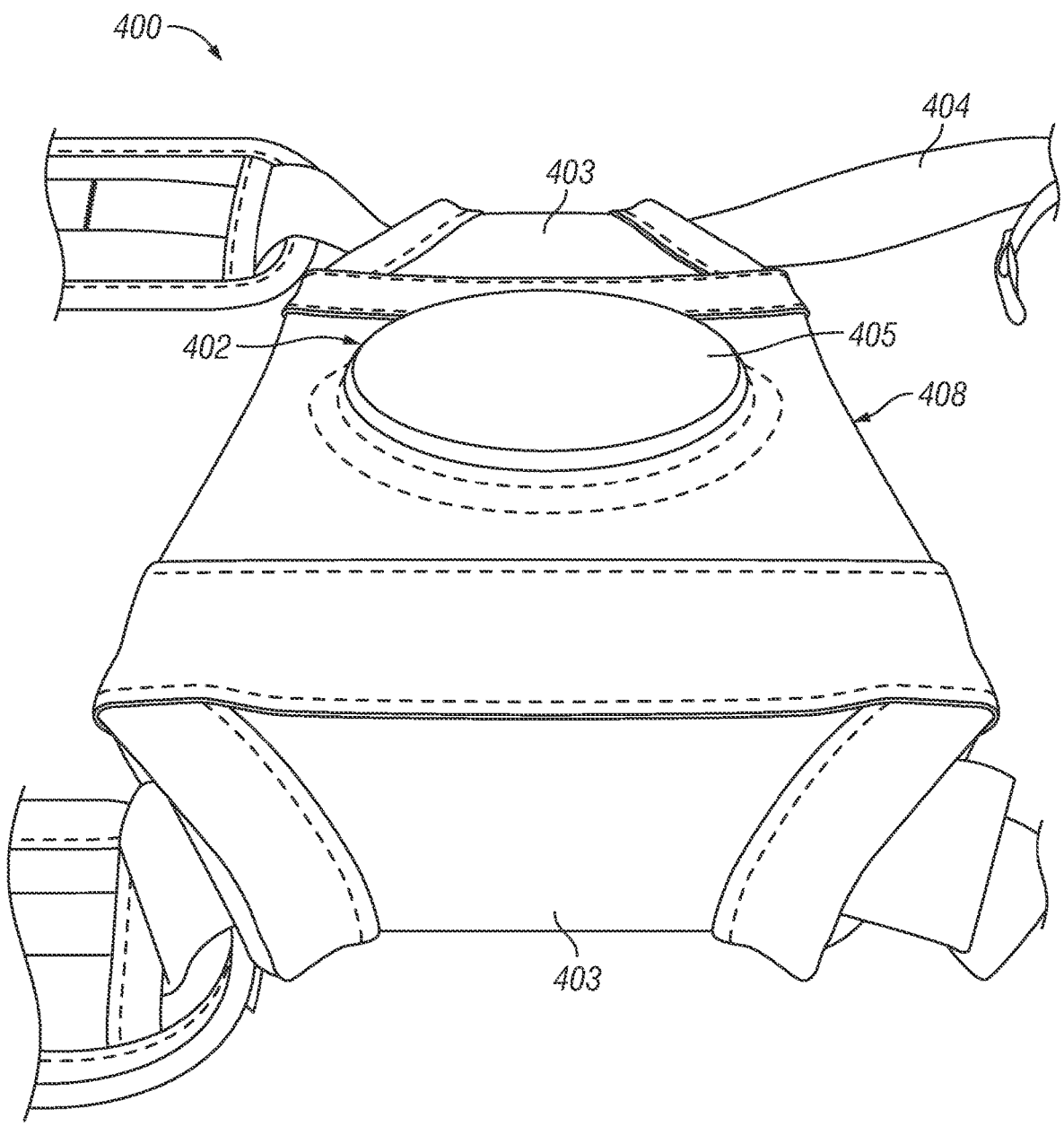
FIG. 4B is a side perspective of the harness in FIG. 4B.

Referring to FIGS. 4A and 4B, additional views of a harness 400 are illustrated. The harness may comprise an encasement 408, a magnet 402, and one or more straps 404. The magnet 402 may be coupled to a surface of the encasement 408 or formed into the interior of the encasement 408. The magnet 402 may comprise any magnetic material known in the art. In a non-limiting example, the magnet 402 may comprise a neodymium alloy and/or a samarium alloy. The encasement 408 may comprise a synthetic material. In some examples, the synthetic material may be a nylon fabric such as corduroy fabric and the like. In examples where the magnet 402 is formed into the interior of the encasement 408, the magnet 402 may be covered with a protective layer 405 or wrapped in the synthetic material of the encasement 408. The encasement may comprise one or more looped panels 403. The looped panels may extend from the sides of the encasement 408. The straps 404 may be inserted through the one or more looped panels 303 extending from the encasement 408.

With reference to FIG. 3, the harness 300 may be secured to the user by placing the straps 304 over the shoulders, with the encasement 308 positioned on the upper portion of the user's back. The male-end clips 310 may be secured with the female-end clips 312, and the male-end clip 316 may be coupled with the female-end clip 318 to secure the cross strap 306 between the straps 304. Depending on the size of the user, adjustments may be made to the harness 300. For example, the adjustable slider buckle 314 may be manipulated to change the position of the encasement 308 on the straps. Additionally, the buckle 320 and the female-end clip 318 may be adjusted. Further, the cross strap 306 may be adjusted by pulling the cross strap 306 either direction through the female-end clip 318. Pulling the cross strap 306 in either direction will provide for a looser or tighter fit around the torso of the user.

Referring to FIGS. 1 and 3, once the harness 300 is secured to the user, the coupled bow 126 and magnet 102 may be coupled to the harness 300 by placing the magnets 102 and 302 together. The attractive force between the magnets 102 and 302 secures the bow 126 to the user. This configuration is advantageous over alternative techniques of carrying bows. For example, the user retains complete mobility of the arms. In contrast, a user carrying a bow via a shoulder strap would not retain full mobility because at least one of the arms would engage the bow to maintain security between the shoulder and the strap. Further, the disclosed configuration enables the user a broader arrange of mobility. For example, the disclosed configuration enables the user to move unencumbered by the bow because of the free range of mobility in the arms and legs. Running, walking, climbing, and the like are vastly easier when carrying a bow according to the disclosed configurations.

The user may disengage the coupled bow 126 and magnet 102 from the harness 300 by pulling on the coupled bow 126 and magnet 102 because the harness 300 is secured to the user. With reference to FIGS. 1 and 2, once the coupled bow 126 and magnet 102 are disengaged from the harness 300, the user may quickly disengage the magnet 202 and rod 206 from the housing 204 by releasing the tooth 212 from the receiver 216. It may be advantageous to disengage the magnet 202 and rod 206 from the housing 204 to provide sufficient weight distribution on the bow. For example, the magnet 202 and rod 206 coupled to the bow may shift the center of gravity and render using the bow more difficult than without the magnet 202 and rod 206 coupled to the bow. Accordingly, it is advantageous that the magnet 202 and rod 206 may be quickly engaged and disengaged from the bow. The present disclose is also adaptable to other instruments. For example, fishing rods, firearms, tools, and the like may be outfitted with a similar apparatus for easier carrying.

Figure 5A:
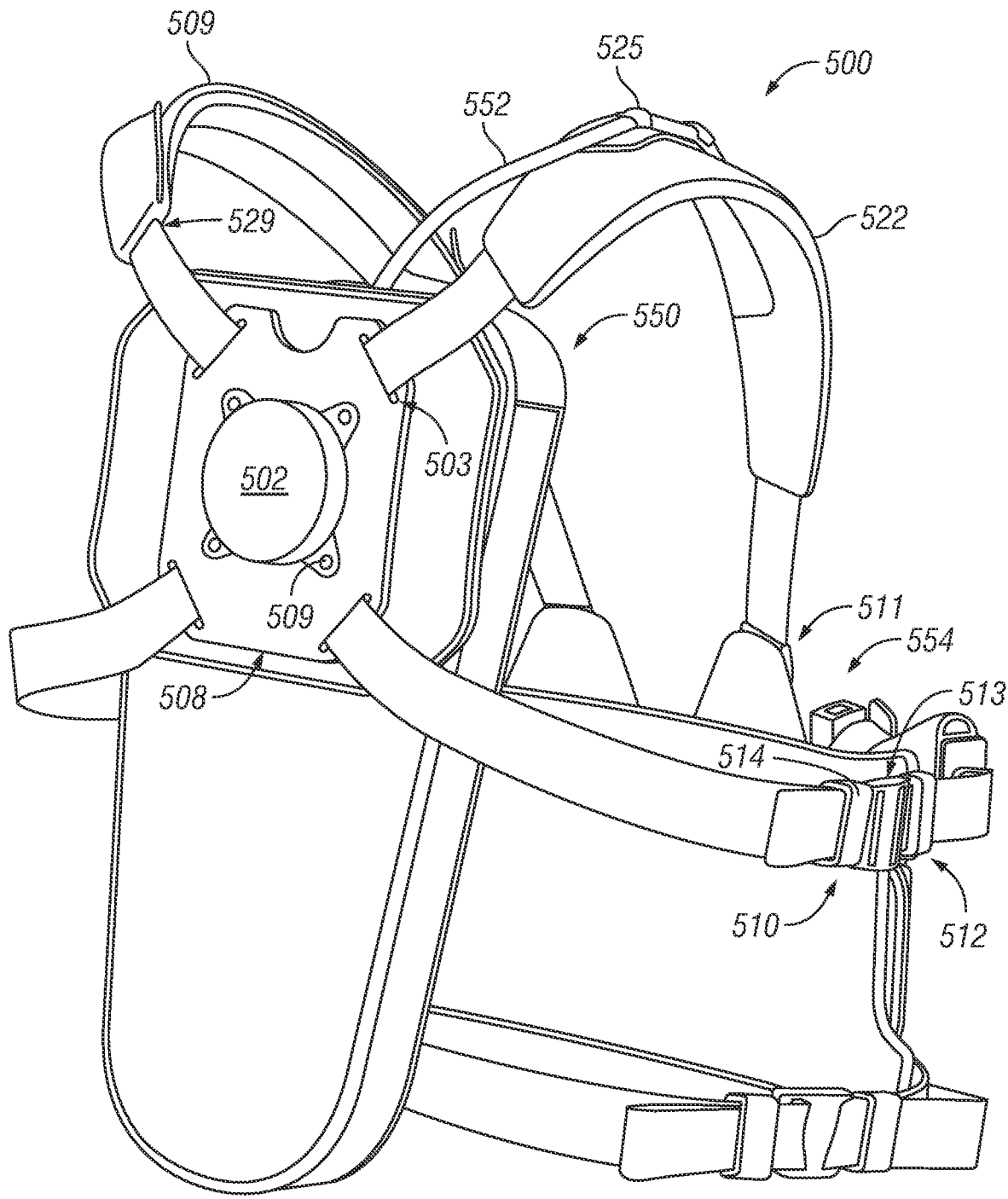
FIG. 5A is a rear perspective view illustration of a harness having a storage pack.

FIG. 5A is a rear perspective view illustration of a harness 500 having a storage pack 550. In at least one example, the storage pack 550 may include a liquid storage container (not illustrated) within the storage pack 550, and the liquid storage container can be coupled to a liquid transfer device 552. The liquid transfer device 552 may include a straw, suction or pressure nozzle, hose, and/or other devices or mechanisms that allow for liquid to be transferred from a storage container. In at least one example, the liquid storage container and the liquid transfer device 552 can be similar to that of a Camlebac® system.

A front storage organizer 554 may be utilized to allow for additional materials, devices, or systems to be carried by a user. In some examples, the front storage organizer 554 may allow for the liquid transfer device 552, or a portion of the liquid transfer device 552 to be stored within a section of the front storage organizer 554. When a portion of the liquid transfer device 552 is stored within a section of the front storage organizer 554 it can be kept clean and/or available for use by a user.

The harness 500 harness may comprise an encasement 508, a magnet 502, and one or more straps 504. The magnet 502 may be coupled to a surface of the encasement 508 or formed into the interior of the encasement 508. The magnet 502 may comprise any magnetic material known in the art. In a non-limiting example, the magnet 502 may comprise a neodymium alloy and/or a samarium alloy. The encasement 508 may comprise a synthetic material or in other examples may include a metal plate that is enclosed or not enclosed in a material. In some examples, the synthetic material may be a nylon fabric such as corduroy fabric and the like. In examples where the magnet 502 is formed into the interior of the encasement 508, the magnet 502 is wrapped in the synthetic material. The encasement 508 may engage with a coupling apparatus on a bow or other device without a magnet 502 coupled to the encasement 508. However, a magnet may still be utilized as part of the coupling apparatus.

The encasement may comprise one or more looped panels 503. The looped panels may extend from the sides of the encasement 508. In some examples, the looped panels 503 may be incorporated into the encasement 508 as part of a single construction via a metal or synthetic material. The straps 504 may be inserted through the one or more looped panels 503 extending from encasement 508. The straps 504 have a first end and a second end. A male-end clip 510 may be coupled to the first end. A female-end clip 512 may be coupled to the second end. The male-end clip 510 may be releasably coupled to the female-end clip 512. In some examples, the male-end clip 510 and the female-end clip 512 may be a squeeze buckle 513. In some examples, the first end and the second end may both have male end or female end clips. In some examples, An end 511 of the strap(s) 504 may include non-clip ends of the strap which can replace clipped versions of the strap ends.

The straps 504 may include a sheath 522 that extends to the second end. The sheath 522 may comprise one or more loops 524 attached to the surface that allow for the securing of the straps 504 to the sheath 522, additionally there may be secondary loops 525 that allow for the liquid transfer device 554 to be coupled to the straps 504 or the sheath 522. The straps 504 are inserted through the loops 524, thereby securing the sheath 522 to the straps. The sheath 522 may comprise a soft material. In a non-limiting example, the sheath 522 may be a padded material such as a foam, which may provide added comfort to the user by absorbing the added weight from the bow. The straps 504 may comprise an adjustable slider buckle 514 positioned between the male-end clip 510 and the encasement 508. In some examples, the straps 504 may comprise an adjustable slider buckle 514 positioned between the female-end clip 512 and the sheath 522. The adjustable slider buckle 514 may be used to adjust the positioning of the encasement 508 when the harness 500 is secured to the user.

In at least one embodiment, the magnet 502 is coupled to a encasement plate 508 via a set of fasteners 509. The fasteners 509 may be rivets, screws, nuts and bolts, or other types of devices or mechanisms that can be placed through an opening or aperture and secure two components together.

Figure 5B:
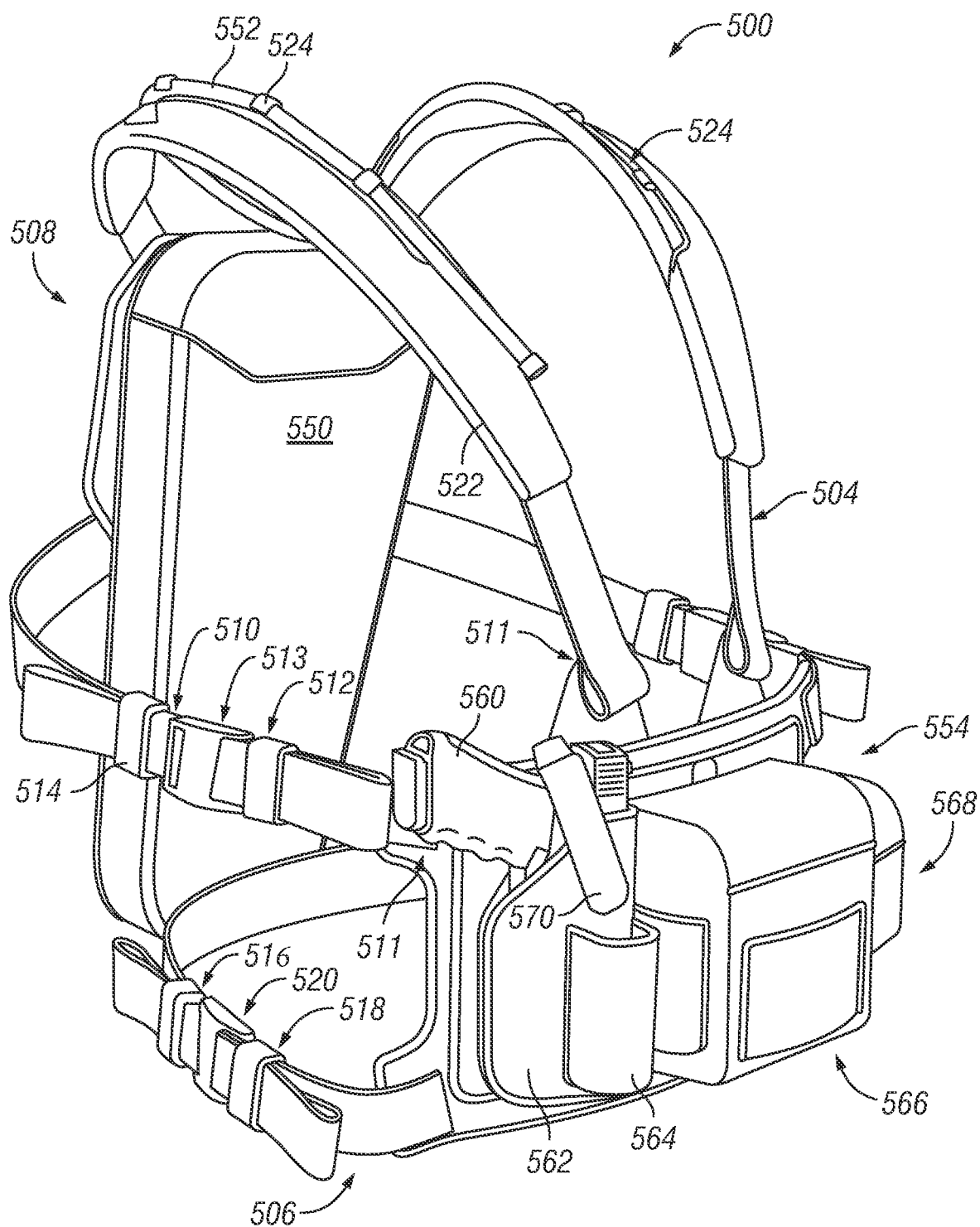
FIG. 5B is a front perspective view illustration of a harness having a storage pack.

FIG. 5B is a front perspective view illustration of a harness 500 having a storage pack 550. In at least one example, the storage pack 550 may include a liquid storage container (not illustrated) within the storage pack 550, and the liquid storage container can be coupled to a liquid transfer device 552. The liquid transfer device 552 may include a straw, suction or pressure nozzle, hose, and/or other devices or mechanisms that allow for liquid to be transferred from a storage container. In at least one example, the liquid storage container and the liquid transfer device 552 can be similar to that of a Camlebac® system.

A front storage organizer 554 may be utilized to allow for additional materials, devices, or systems to be carried by a user. In some examples, the front storage organizer 554 may allow for the liquid transfer device 552, or a portion of the liquid transfer device 552 to be stored within a section of the front storage organizer 554. When a portion of the liquid transfer device 552 is stored within a section of the front storage organizer 554 it can be kept clean and/or available for use by a user. The front storage organizer 554 can allow for a pistol 560, a magazine or clip (not illustrated), a set of binoculars (not illustrated), and/or other devices, mechanisms or systems.

Additionally, the front storage organizer 554 may include a pistol storage sleeve 562, a magazine or clip sleeve 564, a binocular pocket 566, and a miscellaneous pocket 568. Each of these may be utilized for its specific purpose or may be utilized for other reasons. In at least one example, a pistol 560 may be secured within the pistol sleeve 564 with a securing strap 570.

The harness 500 may comprise an encasement 508. The encasement 508 may comprise a synthetic material or in other examples may include a metal plate that is enclosed or not enclosed in a material. In some examples, the synthetic material may be a nylon fabric such as corduroy fabric and the like. The straps 504 may be inserted through the one or more looped panels extending from encasement. The straps 504 have a first end and a second end. A male-end clip 510 may be coupled to the first end. A female-end clip 512 may be coupled to the second end. The male-end clip 510 may be releasably coupled to the female-end clip 512. In some examples, the male-end clip 510 and the female-end clip 512 may be a squeeze buckle 513. In some examples, the first end and the second end may both have male end or female end clips. The encasement 508 may engage with a coupling apparatus on a bow or other device without a magnet 502 coupled to the encasement 508. However, a magnet may still be utilized as part of the coupling apparatus.

The straps 504 may include a sheath 522 that extends to the second end. The sheath 522 may comprise one or more loops 524 attached to the surface that allow for the securing of the straps 504 to the sheath 522, additionally there may be secondary loops 525 that allow for the liquid transfer device 554 to be coupled to the straps 504 or the sheath 522. The straps 504 are inserted through the loops 524, thereby securing the sheath 522 to the straps. The sheath 522 may comprise a soft material. In a non-limiting example, the sheath 522 may be a padded material such as a foam, which may provide added comfort to the user by absorbing the added weight from the bow. The straps 504 may comprise an adjustable slider buckle 514 positioned between the male-end clip 510 and the encasement 508. In some examples, the straps 504 may comprise an adjustable slider buckle 514 positioned between the female-end clip 512 and the sheath 522. The adjustable slider buckle 514 may be used to adjust the positioning of the encasement 508 when the harness 500 is secured to the user.

The storage pack 550 may further include a cross strap 506 that is connected to the front storage organizer 554. The cross strap 506 includes a first end and a second end. The first end of the cross strap 506 may be secured to the storage pack 550 or front storage organizer 554 via a buckle 520. A male-end clip 516 may be coupled to the end of the second end of the cross strap 506. The male-end clip 516 may be releasably coupled to a female-end clip 518 that is secured to the front storage organizer 554 or the storage pack 550. In some examples, the male-end clip 516 and the female-end clip 518 may be a squeeze buckle. The cross strap 506 may comprise a material that has a high degree of elasticity. For example, the cross strap 506 may comprise a polymer such as a cotton webbing, nylon webbing, polyester webbing, polypro webbing, latex webbing, and the like. The male-end clip 516 and the female-end clip 518 may be secured to the storage pack 550 or the front storage organizer 554 via an adjustable slider buckle, which may be used to adjust the positioning of the cross strap 506 when the harness 500 is secured to the user.

Figure 5C:
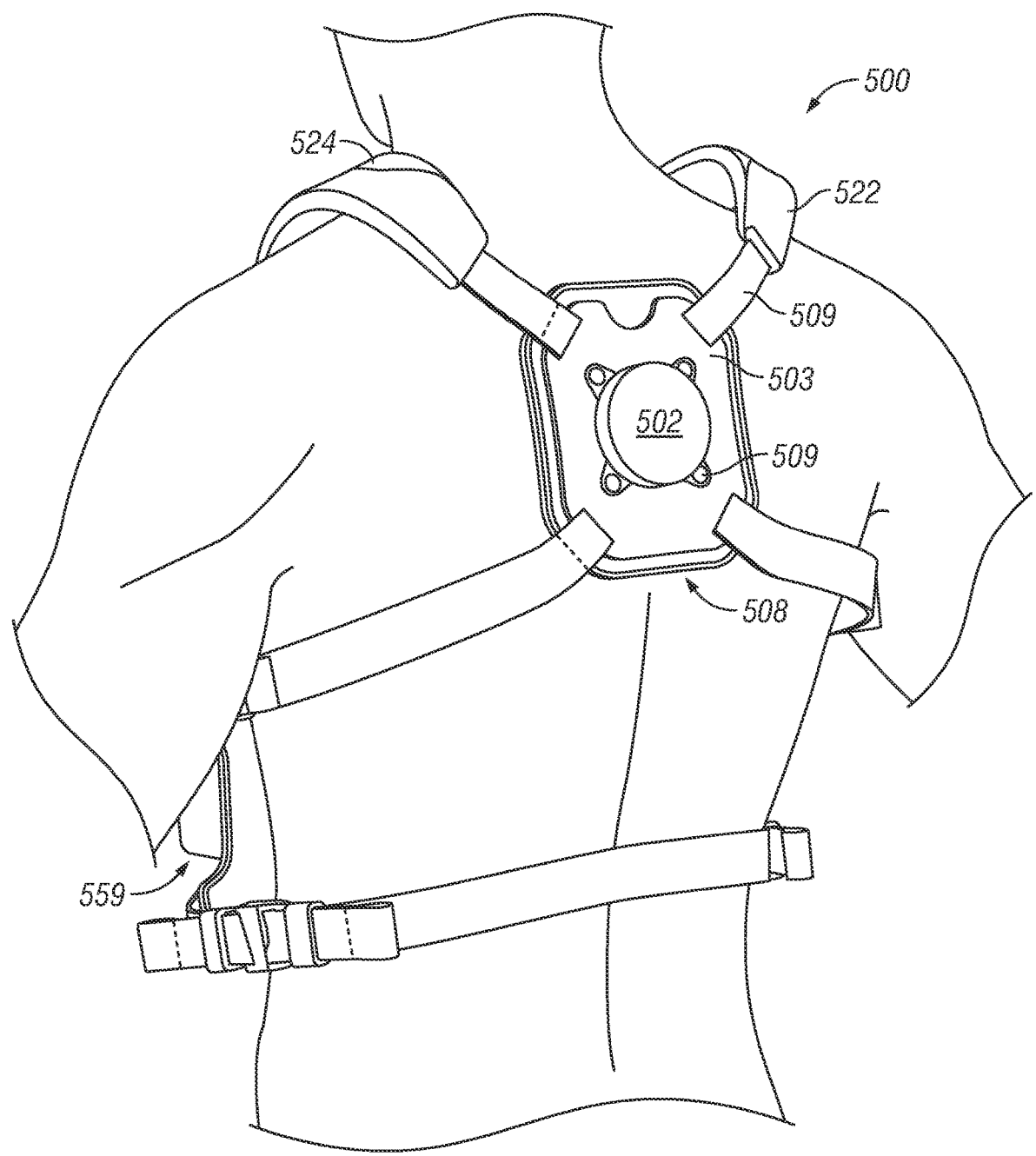
FIG. 5C is a rear perspective view illustration of a harness coupled via straps to a front storage organizer.

FIG. 5C is a rear perspective view illustration of a harness 500 coupled via straps to a front storage organizer 554. The front storage organizer 554 may be utilized to allow for additional materials, devices, or systems to be carried by a user. The harness 500 may comprise an encasement 508, a magnet 502, and one or more straps 504. The magnet 502 may be coupled to a surface of the encasement 508 or formed into the interior of the encasement 508. The magnet 502 may comprise any magnetic material known in the art. In a non-limiting example, the magnet 502 may comprise a neodymium alloy and/or a samarium alloy. The encasement 508 may comprise a synthetic material or in other examples may include a metal plate that is enclosed or not enclosed in a material. In some examples, the synthetic material may be a nylon fabric such as corduroy fabric and the like. In examples where the magnet 502 is formed into the interior of the encasement 508, the magnet 502 is wrapped in the synthetic material. The encasement 508 may engage with a coupling apparatus on a bow or other device without a magnet 502 coupled to the encasement 508. However, a magnet may still be utilized as part of the coupling apparatus.

The encasement may comprise one or more looped panels 503. The looped panels may extend from the sides of the encasement 508. In some examples, the looped panels 503 may be incorporated into the encasement 508 as part of a single construction via a metal or synthetic material. The straps 504 may be inserted through the one or more looped panels 503 extending from encasement 508. The straps 504 have a first end and a second end.

The straps 504 may include a sheath 522 that extends to the second end. The sheath 522 may comprise one or more loops 524 attached to the surface that allow for the securing of the straps 504 to the sheath 522, additionally there may be secondary loops 525 that allow for the liquid transfer device 554 to be coupled to the straps 504 or the sheath 522. The straps 504 are inserted through the loops 524, thereby securing the sheath 522 to the straps. The sheath 522 may comprise a soft material. In a non-limiting example, the sheath 522 may be a padded material such as a foam, which may provide added comfort to the user by absorbing the added weight from the bow.

In at least one embodiment, the magnet 502 is coupled to a encasement plate 508 via a set of fasteners 509. The fasteners 509 may be rivets, screws, nuts and bolts, or other types of devices or mechanisms that can be placed through an opening or aperture and secure two components together. Although embodiments of the invention have been described with reference to several elements, any element described in the embodiments described herein are exemplary and can be omitted, substituted, added, combined, or rearranged as applicable to form new embodiments. A skilled person, upon reading the present specification, would recognize that such additional embodiments are effectively disclosed herein. For example, where this disclosure describes characteristics, structure, size, shape, arrangement, or composition for an element or process for making or using an element or combination of elements, the characteristics, structure, size, shape, arrangement, or composition can also be incorporated into any other element or combination of elements, or process for making or using an element or combination of elements described herein to provide additional embodiments.

Additionally, where an embodiment is described herein as comprising some element or group of elements, additional embodiments can consist essentially of or consist of the element or group of elements. Also, although the open-ended term "comprises" is generally used herein, additional embodiments can be formed by substituting the terms "consisting essentially of" or "consisting of."

While this invention has been particularly shown and described with reference to preferred embodiments, it will be understood by those skilled in the art that various changes in form and detail may be made therein without departing from the spirit and scope of the invention. The inventors expect skilled artisans to employ such variations as appropriate, and the inventors intend the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An bow mounted apparatus for securing a bow to a user, comprising:
   a magnet
   a housing defining a path through the housing;
   a rod coupled to the magnet and configured to be received by the housing;
   a lever movably coupled to the housing, the lever comprising an arm, a base, and a cylinder, the arm having a top surface and a bottom surface;
   and
   wherein:
   the coupled magnet and rod are inserted into the housing; and
   the lever is rotated thereby tightening the housing around the rod and connecting the magnet to the bow, wherein the lever further comprises:
      the arm includes a tooth protruding from the bottom surface;
      the tooth is configured to releasably couple to the receiver formed through the housing;
      the base of the lever has a first channel;
      the cylinder includes a second channel having a threaded portion;
      the cylinder inserts into the base and the second channel aligns with the first channel of the base; and
      the first screw is threaded through the first channel and into the threaded portion of the second channel, thereby coupling the lever and the housing;
      a third screw threaded through the bow and into the distal end of the housing, thereby connecting the housing to the bow.

2. The bow mounted apparatus of claim 1, wherein the magnet further comprises:
   a first surface and a second surface; and
   a passageway extending through the magnet from the first surface to the second surface.

3. The bow mounted apparatus of claim 1, wherein the housing further comprises:
   a proximal end and a distal end;
   a latch extending from the housing, the latch having an opening;
   a first screw inserted through the opening of the latch; and
   a receiver formed through the housing.

4. The bow mounted apparatus of claim 3, wherein the rod is placed within the proximal end of the housing.

5. The bow mounted apparatus of claim 1, wherein the rod further comprises:
   a second screw;
   a first member and a second member, wherein:
   the second member defines a threaded path;
   the first member is inserted into an opening in the first surface of the magnet;
   the second member is inserted into an opening in the second surface of the magnet; and
   the second screw is inserted through the first member and threaded with the second member, thereby coupling the magnet with the rod.

6. The bow mounted apparatus of claim 1, wherein when the lever is rotated the tooth is engaged with a receiver to secure the rod and housing together.

7. A system for carrying a bow, the system comprising:
   a harness having a first magnet and one or more straps;
   an adapter;
   a housing defining a path;
   a rod for engaging with the housing and engaging with the adapter; and
   a lever movably coupled to the housing, the lever comprising an arm, a base, and a cylinder, the arm having a top surface and a bottom surface, wherein the lever engages with the rod to secure the housing, rod, and adaptor together, wherein the lever further comprises:
      the arm includes a tooth protruding from the bottom surface;
      the tooth is configured to releasably couple to the receiver formed through the housing;
      the base of the lever has a first channel;
      the cylinder includes a second channel having a threaded portion,
      the cylinder inserts into the base and the second channel aligns with the first channel of the base; and
      the first screw is threaded through the first channel and into the threaded portion of the second channel, thereby coupling the lever and the housing;
      a third screw threaded through the bow and into the distal end of the housing, thereby connecting the housing to the bow.

8. The system of claim 7, wherein the one or more straps are configured to secure the first magnet to a user.

9. The system of claim 7, where the adapter further comprises: a second magnet.

10. The system of claim 9, wherein the second magnet further comprises:
    a first surface and a second surface; and
    a passageway extending through the magnet from the first surface to the second surface.

11. The system of claim 7, wherein the housing further comprises:
    a proximal end and a distal end;
    a latch extending from the housing, the latch having an opening;
    a first screw inserted through the opening of the latch; and
    a receiver formed through the housing.

12. The system of claim 7, wherein the rod further comprises:
    a second screw;
    a first member and a second member, wherein:
    the second member defines a threaded path;
    the first member is inserted into an opening in the first surface of the magnet;
    the second member is inserted into an opening in the second surface of the magnet; and
    the second screw is inserted through the first member and threaded with the second member, thereby coupling the magnet with the rod.

13. The system of claim 7, wherein the coupled magnet and rod are inserted into the proximal end of the housing, and wherein the lever is rotated to couple the tooth with the receiver, thereby tightening the housing around the rod and connecting the magnet to the bow.

14. The system of claim 7, wherein the adapter attaches to the harness via the first magnet and the second magnet, thereby securing the bow onto the user.

* * * * *